US010956908B2

(12) United States Patent
Hollmig

(10) Patent No.: US 10,956,908 B2
(45) Date of Patent: Mar. 23, 2021

(54) METHOD FOR INITIATING A CASHLESS PAYMENT PROCESS FROM A MOTOR VEHICLE

(71) Applicant: Audi AG, Ingolstadt (DE)

(72) Inventor: Ralph Hollmig, Ingolstadt (DE)

(73) Assignee: Audi AG, Ingolstadt (DE)

( * ) Notice: Subject to any disclaimer, the term of this patent is extended or adjusted under 35 U.S.C. 154(b) by 134 days.

(21) Appl. No.: 15/764,754

(22) PCT Filed: Nov. 15, 2016

(86) PCT No.: PCT/EP2016/077623
§ 371 (c)(1),
(2) Date: Mar. 29, 2018

(87) PCT Pub. No.: WO2017/137105
PCT Pub. Date: Aug. 17, 2017

(65) Prior Publication Data
US 2018/0349910 A1 Dec. 6, 2018

(30) Foreign Application Priority Data

Feb. 9, 2016 (DE) ...................... 10 2016 001 454.7

(51) Int. Cl.
*G06Q 20/40* (2012.01)
*G06Q 20/18* (2012.01)
(Continued)

(52) U.S. Cl.
CPC ... *G06Q 20/40145* (2013.01); *G06K 7/10722* (2013.01); *G06K 7/1417* (2013.01);
(Continued)

(58) Field of Classification Search
CPC .................................................. G06Q 20/40
(Continued)

(56) References Cited

U.S. PATENT DOCUMENTS 7,813,822 B1 * 10/2010 Hoffberg .......... H04N 21/44222
700/94
9,569,962 B2   2/2017 Schuller
(Continued)

FOREIGN PATENT DOCUMENTS

DE    102011105420 B3   10/2012
DE    102012021403 A1    4/2014
(Continued)

OTHER PUBLICATIONS

Kiruthiga N, Iatha L, Thangsamy S, Real Time Biometrics based Vehicle Security System with GPS and GSM Technology, ScienceDirect, Procedia Computer Science 47 (2015) 471-479 (Year: 2015).*
(Continued)

*Primary Examiner* — Elizabeth H Rosen
*Assistant Examiner* — Kevin T Poe
(74) *Attorney, Agent, or Firm* — Sterne, Kessler, Goldstein & Fox P.L.L.C.

(57) ABSTRACT

Described is a method for initiating a cashless payment transaction from a motor vehicle, wherein in a vehicle-external, stationary device an optical detecting apparatus generates image data of a representation apparatus positioned on the motor vehicle for optically representing a chassis number of the motor vehicle, and a recognition apparatus recognizes the representation apparatus in the image data, and based on the recognized representation apparatus, the chassis number of the motor vehicle is determined, and a retrieval apparatus, depending on the determined chassis number, retrieves user data of a user from a data storage, wherein the user data contain bank account data for a cashless payment, and wherein a control device performs the payment transaction in a cashless way, based on the bank account data.

7 Claims, 1 Drawing Sheet

(51) Int. Cl.
*G06Q 20/32* (2012.01)
*G06Q 30/04* (2012.01)
*G07F 13/02* (2006.01)
*G06K 7/10* (2006.01)
*G06K 7/14* (2006.01)

(52) U.S. Cl.
CPC ........... *G06Q 20/18* (2013.01); *G06Q 20/327* (2013.01); *G06Q 20/3274* (2013.01); *G06Q 20/40* (2013.01); *G06Q 30/04* (2013.01); *G07F 13/025* (2013.01)

(58) Field of Classification Search
USPC .......................................................... 705/44
See application file for complete search history.

(56) References Cited

U.S. PATENT DOCUMENTS

| | | |
|---|---|---|
| 2010/0280956 A1 | 11/2010 | Chutorash et al. |
| 2010/0332363 A1 | 12/2010 | Duddle et al. |
| 2012/0004769 A1* | 1/2012 | Hallenbeck ............ G06Q 30/06 700/232 |
| 2012/0323763 A1 | 12/2012 | Michael |
| 2013/0281017 A1 | 10/2013 | Bondesen et al. |
| 2014/0213176 A1 | 7/2014 | Mendelson |
| 2014/0244504 A1 | 8/2014 | Owen |
| 2014/0344027 A1* | 11/2014 | Frank ................. G06Q 30/0284 705/13 |

FOREIGN PATENT DOCUMENTS

| | | | |
|---|---|---|---|
| DE | 102013000031 A1 * | 7/2014 | ............. G07B 15/02 |
| EP | 2 124 177 A1 | 11/2009 | |
| EP | 2 727 751 A1 | 5/2014 | |

OTHER PUBLICATIONS

International Search Report and Written Opinion of the International Searching Authority directed to related International Application No. PCT/EP2016/077623, dated Feb. 7, 2017, with attached English-language translation; 19 pages.

Lupu et al., "Multimodal Biometrics for Access Control in an Intelligent Car," *3rd International Symposium on Computational Intelligence and Intelligent Informatics*, Mar. 2007, pp. 261-267, IEEE, New York, NY.

English-language abstract for German patent DE 102011105420 B3, published Oct. 4, 2012; 1 page.

International Preliminary Report on Patentability directed to related International Patent Application No. PCT/EP2016/077623, dated Aug. 14, 2018, with attached English-language translation; 14 pages.

* cited by examiner

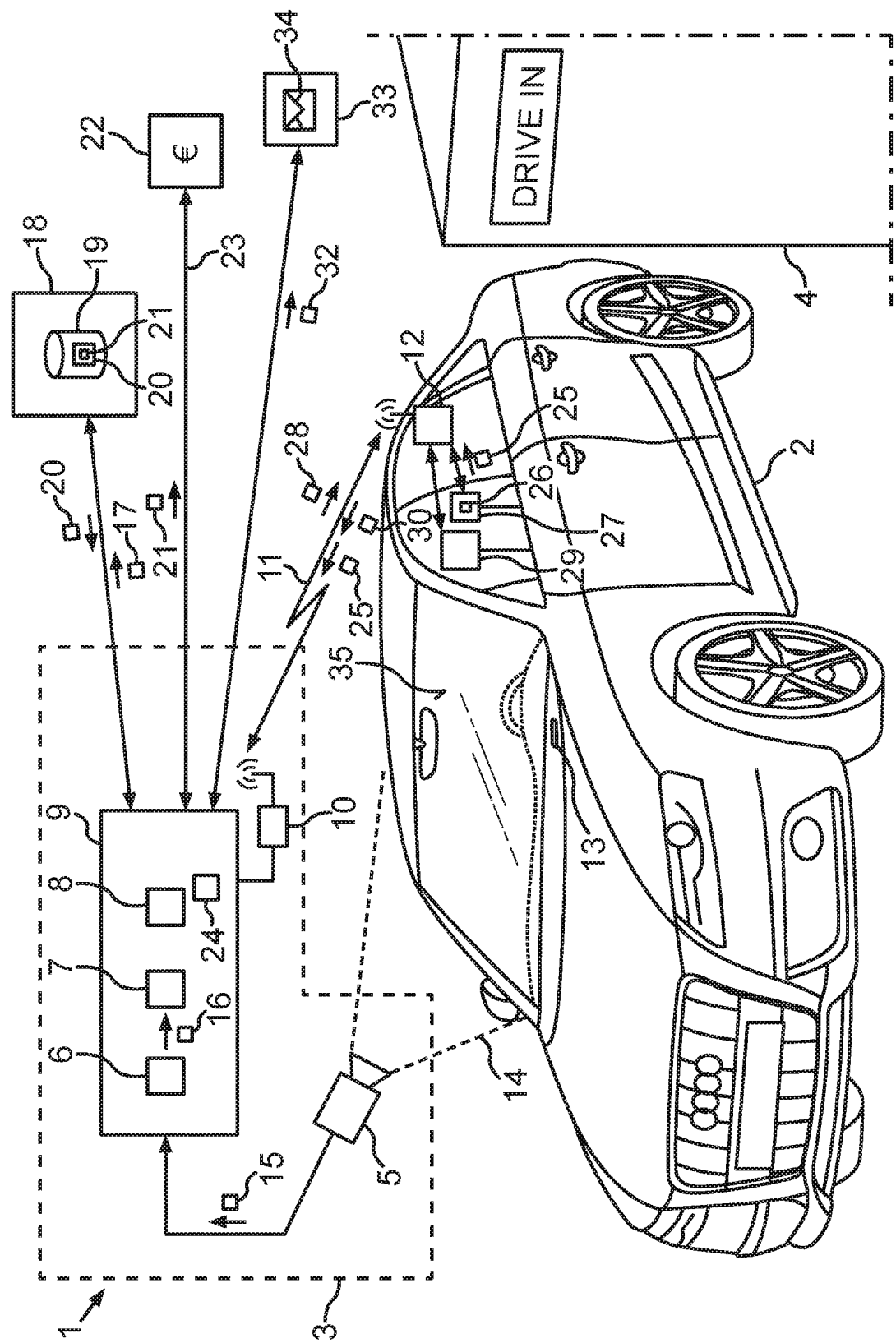

METHOD FOR INITIATING A CASHLESS PAYMENT PROCESS FROM A MOTOR VEHICLE

The invention refers to a method for initiating a cashless payment transaction from a motor vehicle. The invention also comprises a device, through which the payment transaction may be initiated from the motor vehicle. The motor vehicle and the device form a payment system for a cashless payment, which is also part of the invention.

In order to pay for a product in a cashless way from a motor vehicle, such as fuel with which a tank has been filled, US 2010/0332363 A1 teaches that the motor vehicle sends identification data to a stationary device, which in turn, based on these identification data, performs the payment transaction. The identification data may comprise the chassis number, for example. In order to prevent a tampering of the system, a receipt may be sent to the motor vehicle user, in order to allow him or her to verify the payment transaction. In order to transmit above said identification data to the device, however, a Wi-Fi connection (WLAN—Wireless Local Area Network) is required. The WLAN connection requires that the motor vehicle and the vehicle-external stationary device are technically adapted to each other. The execution of the payment transaction by means of the device is thus only possible after a corresponding technical upgrade of the motor vehicle.

In DE 10 2011 105 420 B3, an automated payment transaction is performed on the basis of a digital authorization token. In order to prevent in this case that the digital authorization token is captured and then used for further payment transactions, it is always checked, whether the motor vehicle, for which the authorization token is valid, is also actually physically present near the device for performing the payment transaction. To this end, a video surveillance with a license plate recognition system may be provided. The video surveillance of license plates has the drawback that after changing the license plate, such as due to the vehicle owner moving to another address, a complex adjustment of the payment system must take place, in order to allow the payment transaction to work also with the new license plate.

In DE 10 2012 021 403 A1, in a camera image showing various motor vehicles, the one which is sending certain digital identification data through radio transmission, may be identified in that the vehicle sends together with digital identification data, also a speed information, for example, and then the camera image is checked, in order to determine which of the vehicles shown is actually moving at a corresponding driving speed. Thus, it may be checked, for instance, whether a vehicle may access a parking lot, since this same vehicle is recognized in the camera image as the vehicle which is waiting at the entrance barrier of the parking lot.

BRIEF DESCRIPTION OF DRAWINGS/FIGURES

FIG. 1 shows a schematic representation of an embodiment of the inventive payment system.

DETAILED DESCRIPTION

The object of the invention is to provide the initiation of an automated payment transaction from a motor vehicle without the need of a corresponding complex technical adjustment of the motor vehicle while keeping the likelihood of malicious manipulation on a low level.

This object is achieved by the subject matters of the independent claims. Advantageous elaborations of the invention are disclosed by the characteristics of the dependent claims, the following description and the figure.

The invention comprises a method for initiating a cashless payment transaction from a motor vehicle. The payment transaction itself is performed by a vehicle-external stationary device, wherein the initiation of the payment transaction depends on the motor vehicle.

In the invention, order data regarding a product to be provided in and/or on the vehicle are received through a radio connection from the motor vehicle. This is advantageous in that a person may send the order from the closed motor vehicle. The order provided via a radio connection is not critical for security.

An optical detecting apparatus of the device generates image data of a representation apparatus which is positioned on the motor vehicle, for optically representing a chassis number of the motor vehicle. In other words, the representation apparatus is positioned on or in the motor vehicle for optically representing the chassis number of the motor vehicle. The image data contain a picture of this representation apparatus. A recognition apparatus of the device recognizes the representation apparatus in the image data and based on the recognized representation apparatus the chassis number of motor vehicle is determined. Thus, the chassis number of the motor vehicle which is optically detected by the detecting apparatus is known or present in the device. In other words, chassis numerical data are provided in the device. A retrieval apparatus determines, depending on the determined chassis number, user data of a user from a data storage. The retrieval apparatus may thus request or query user data in a server through the Internet, for example. The data storage may also be provided in the same device. The user data contain bank account data for a cashless payment. A control apparatus of the device then performs the payment transaction on the basis of the bank account data in a cashless manner. A remittance transaction may thus be initiated or triggered based on the bank account data, for example.

In the invention, description data regarding the goods and/or services to be payed are transmitted over a radio connection to the motor vehicle. The advantage is thus provided that in the motor vehicle the verification of the ordered goods and/or services may occur, for example visually, by the driver.

In the invention the retrieval of user data and/or the execution of the payment transaction only take place if a release signal is received from a biometric scanning device of the motor vehicle, wherein the release signal confirms or indicates the identity of a person, from whom the scanning device receives biometric data. In other words, the representation of the chassis number alone is not sufficient for triggering the payment transaction from the vehicle. A person has additionally to input biometric data in the vehicle over a biometric scanning device, such as scanning the iris of the person by the scanning device. The payment transaction is performed only when the scanning device transfers or sends the release signal comprising the confirmation of the person's identity or the indication of the person's identity to the device. Thus, even if the motor vehicle is stolen, it is impossible for another person to trigger the payment transaction.

The invention provides the advantage that the execution of the payment transaction is only possible if the motor vehicle itself is positioned in the detection area of the optical detecting apparatus, so that the detecting apparatus may detect the representation apparatus for representing the chassis number. The systems thus do not rely on a radio signal, which may be intercepted or reproduced.

The invention also comprises optional elaborations, the characteristics of which may provide additional advantages.

According to an elaboration, the representation apparatus to be detected is a written sequence of characters of the chassis number, which may for example be written or represented behind a windshield glass or windscreen of the motor vehicle. The representation formed by a written sequence of characters has the advantage that it may be verified by a person without auxiliary means. An additional or alternative elaboration consists in that the chassis number is detected as a QR-code (QR—Quick Response, rapid response). Thus, a robust automatic detection of the chassis number is advantageously provided. The QR-code preferably also comprises redundant data for error recognition and/or error correction. Thus, for instance, in case of rain, when the QR-code is only partially recognizable or is erroneously recognized by the detecting apparatus due to rain drops, the data may still be recognized.

In an elaboration the representation apparatus is detected by a video camera. The advantage in this case is that the representation apparatus may be detected even when the motor vehicle is moving. A changing light reflection on the windshield may thus be compensated by the detecting apparatus during detection, for example. In an alternative embodiment the detecting apparatus uses a single image camera for detecting the representation apparatus. This is advantageous in that it allows the recognition of the representation apparatus in the image data by using only a reduced computational capacity.

In an elaboration, the device receives the release signal from a fingerprint scanner, as a scanning device. This is advantageous in that a fingerprint scanner, which may already be provided in the motor vehicle, for example, for releasing a motor starting function of the vehicle, may also be used for authorizing the payment transaction.

In an elaboration, receipt data regarding the payment transaction are sent to a messaging address stored among the user data. An email message may for instance be generated for describing the payment transaction through the receipt data. In this way, an acknowledgement and/or receipt regarding the payment transaction is generated.

As already said, the invention also refers to a device for stationary operation for a cashless transaction from a motor vehicle. The device has an optical detecting apparatus for detecting image data from a representation apparatus provided on the vehicle wherein the representation apparatus optically represents a chassis number of the motor vehicle. The optical detecting apparatus may comprise, for example, a video camera or a single picture camera. The device also comprises a recognition apparatus for determining the representation apparatus in the image data and for determining the chassis number of the motor vehicle on the basis of the recognized representation apparatus. The recognition apparatus may be provided as an image processing program module in a computing apparatus of the device, for example. The device also has a retrieval apparatus for determining user data of a user from a data storage depending on the determined chassis number, wherein the user data contain bank account data for a cashless payment. Such a retrieval apparatus may for instance be a program module for requesting the user data from a server on the Internet and/or a program module for reading a local data storage of the device. The device also has a control apparatus for cashless performing of the payment transaction based on the bank account data. The control apparatus may also be a program module of said computing apparatus.

The described program modules and the optical detecting apparatus are generally configured to executing an embodiment of the inventive method. In other words, the program modules comprise corresponding program instructions, which, when executed, cause the computing apparatus to execute or perform an embodiment of the inventive method.

The invention finally also comprises a payment system for a cashless payment from a motor vehicle, wherein the payment system is obtained through a combination of an embodiment of the inventive device and at least one motor vehicle with the described optical representation apparatus of the chassis number.

An exemplary embodiment of the invention is described in the following. To this end, FIG. 1 shows a schematic representation of an embodiment of the inventive payment system.

The following example is a preferred embodiment of the invention. In the exemplary embodiment, the described components of the embodiment represent respective individual characteristic of the invention, to be considered independently from each other, which also independently develop the invention and that may also be considered individually or in any other combination as part of the invention. The described embodiment may also be completed with other already described characteristics of the invention.

FIG. 1 shows a payment system 1, which may comprise a motor vehicle 2 and a vehicle-external, stationary device 3. The motor vehicle 1 may for example be a car, in particular for transporting persons or goods. For clarity, it is assumed that the motor vehicle 2 is moved to a provider 4 of a product, since the driver (not shown) of motor vehicle 2 wants to buy a product, such as a service or good, from inside the motor vehicle. The provider 4 may for example be an entrance controller for a payment parking lot or a parking silo, a service provider such as a car wash or a restaurant or a pharmacy or a bank or a toll station, wherein this list is only illustrative.

In motor vehicle 2, the ordered goods or services may be paid by means of the payment system 1 from the motor vehicle 2. To this end, the device 3 of payment system 1 is used. The device 3 may comprise an optical detecting apparatus 5, a recognition apparatus 6, a retrieval apparatus 7 and a control apparatus 8. The apparatuses 6, 7, 8 may be, for example, program modules of a computing apparatus 9 of device 3. The device 3 may also have a communication apparatus 10, through which a radio connection 11 with a corresponding communication device 12 of motor vehicle 2 may be provided. The communication devices 10, 12 may provide the radio connection 11 for example by means of a Wi-Fi Standard.

At or in the motor vehicle 2 a representation apparatus 13 may be provided, which represents the fixed chassis number of motor vehicle 2. The representation apparatus 13 may for example be a character sequence (for example: "WV2ZZZ2K . . . ") or even a QR-code.

A detection area 14 of the optical detecting apparatus 5 is provided in an area, where the motor vehicle 2 must be positioned during the execution of the payment transaction for the ordered product. The optical detecting apparatus 5 detects at least the representation apparatus 13 of motor vehicle 2. The optical detecting apparatus 5 may be provided, to this end, with a video camera or snapshot camera.

The optical detecting apparatus 5 generates image data 15, in which the optically detected representation apparatus 13 is reproduced or represented. The recognition apparatus 6 extracts or recognizes, based on the image data 15, the information regarding the chassis number, as represented by the representation apparatus 13. The recognition apparatus 6 may be configured, for example, to performing a method of image recognition, such as by using HMMs (HMM: Hidden Markov Model).

The chassis number 16 determined from the image data 15 may be provided by the recognition apparatus 6 to the retrieval apparatus 7. The retrieval apparatus 7 may send, for example, a request signal 17, to a device-external server apparatus 18, such as an internet database. The request signal 17 indicates the chassis number 16. The server 18 may have a data storage 19, in which user data 20 for the chassis number 16 may be stored, which may contain the bank account data 21. The server 18 provides the user data 20 to the control apparatus 8. The data storage 19 may also be part of device 3.

The control apparatus 8, based on the bank account data 21 from data storage 19 initiates the payment transaction for the product at a credit institution 22. This may be accomplished, for example, through an internet connection 23.

The device may also be provided with a security apparatus 24, which may be configured, to example, for blocking the retrieval and/or control apparatus, if the following identity verification of a person inside the motor vehicle 2 fails.

The security apparatus 24 may for example receive through the radio connection 11 from the motor vehicle 2 an authorization signal 25, which confirms, that a certain person is present inside the motor vehicle 2, or which identifies the person sitting inside the motor vehicle 2. The authorization signal 25 may be generated on the basis of biometric data 26, which may be provided by a biometric scanning device 27 of motor vehicle 2, which generates the biometric data 26 of a person inside the motor vehicle 2. The scanning device 27 may for example be a fingerprint scanner. The scanning device 27 may be positioned, as a fingerprint scanner, for example, in a key in a central console of motor vehicle 2, or on a screen of motor vehicle 2.

On the other hand, in order to allow a person inside the motor vehicle 2 to verify the payment transaction, it may be foreseen that the descriptive data 28, which describe the product and/or the amount to be paid, are transferred from the device 3 to the motor vehicle 2 for example through the radio connection 11 and are visually represented, for example inside the motor vehicle 2 by a display device 29 to the person inside the motor vehicle 2. The display device 29 may be provided for example on the basis of an infotainment system (information-entertainment system) of motor vehicle 2.

In order to increase the comfort, the order may also be provided by the person inside the motor vehicle 2 by radio connection, whereby order data 30 may be sent from the motor vehicle 2, for example, through the radio connection 11, to the device 3 or directly to provider 4.

After the execution of the payment transaction, the control apparatus may generate a message with receipt data 32, which may be stored for example in an email server 33 at a messaging address 34. The messaging address 34 may also be part of the user data 20 and may indicate the address of the paying person, for example.

In payment system 1, the chassis number 16 of motor vehicle 2 is used as a payment function. The chassis number identifies the motor vehicle 2 uniquely and is also associated with a person, i.e. the owner of the motor vehicle 2. The chassis number 16 is visible, for example, from outside, on a windshield 35 of motor vehicle 2.

Through the chassis number, the bank account and the email address of the owner are stored. It is used in connection with the display device 29 and the scanning device 27 of the motor vehicle 2 as an identifier. In case of request of a service (parking, servicing, drive-in, restaurant, pharmacy, bank, toll), the chassis number is scanned. The order process (for example an invoice for food and beverages) is received through radio connection 11, such as Wi-Fi, in the motor vehicle 2 and appears in the display device 29. If the person accepts the order, payment is triggered by finger print. An acknowledgment or receipt may then be again sent to the email address.

Thus, a cashless payment for services is possible from inside the motor vehicle 2 or via the motor vehicle 2.

The example shows, in other words, how the invention allows a chassis number to be used as payment functionality.

The invention claimed is:

1. A method for initiating a secure cashless payment transaction comprising:
   receiving, by a vehicle-external stationary device, through a radio connection from a motor vehicle, order data regarding a product to be provided in and/or at the motor vehicle;
   generating, by a camera, image data of a chassis number of the motor vehicle;
   based on the image data, recognizing, by a processor, the chassis number of the motor vehicle;
   determining, by the processor, user data of a user from a data storage, based on the recognized chassis number, wherein the user data comprises bank account data for a cashless payment;
   transmitting descriptive data regarding the ordered product through the radio connection to the motor vehicle for verifying the ordered product;
   receiving, from a biometric scanning device of the motor vehicle, an authorization signal that confirms or indicates an identity of a person whose biometric data is received at the biometric scanning device of the motor vehicle; and
   in response to receiving the authorization signal, executing, by the processor, the cashless payment transaction based on the determined bank account data.

2. The method of claim 1, wherein the recognized chassis number is a written character sequence or a QR-code representing the chassis number.

3. The method of claim 2, wherein the QR-code also comprises redundant data for error recognition and/or error correction.

4. The method of claim 1, wherein the camera is a video camera or a single picture camera.

5. The method of claim 1, wherein the biometric scanning device is a fingerprint scanner.

6. The method of claim 1, wherein receipt data regarding the payment transaction are sent to a messaging address, which is stored among the user data.

7. A stationary device for operating a secure cashless payment from a motor vehicle comprising:
   a camera configured to generate image data of a chassis number of the motor vehicle; and
   a processor configured to:
      based on the image data, recognize the chassis number of the motor vehicle;

determine user data of a user from a data storage, based on the recognized chassis number, wherein the user data comprises bank account data for a cashless payment;

receive, from a biometric scanning device of the motor vehicle, an authorization signal that confirms or indicates an identity of a person whose biometric data is received at the biometric scanning device of the motor vehicle; and in response to receiving the authorization signal, execute the cashless payment transaction based on the bank account data, wherein the stationary device is configured to:

receive through a radio connection from a motor vehicle, order data regarding a product to be provided in and/or at the motor vehicle, and transmit descriptive data regarding the ordered product through the radio connection to the motor vehicle for verifying the ordered product.

\* \* \* \* \*